April 13, 1943.    J. J. ROTHWELL    2,316,626
CONTROL DEVICE
Filed Nov. 4, 1940    2 Sheets-Sheet 1
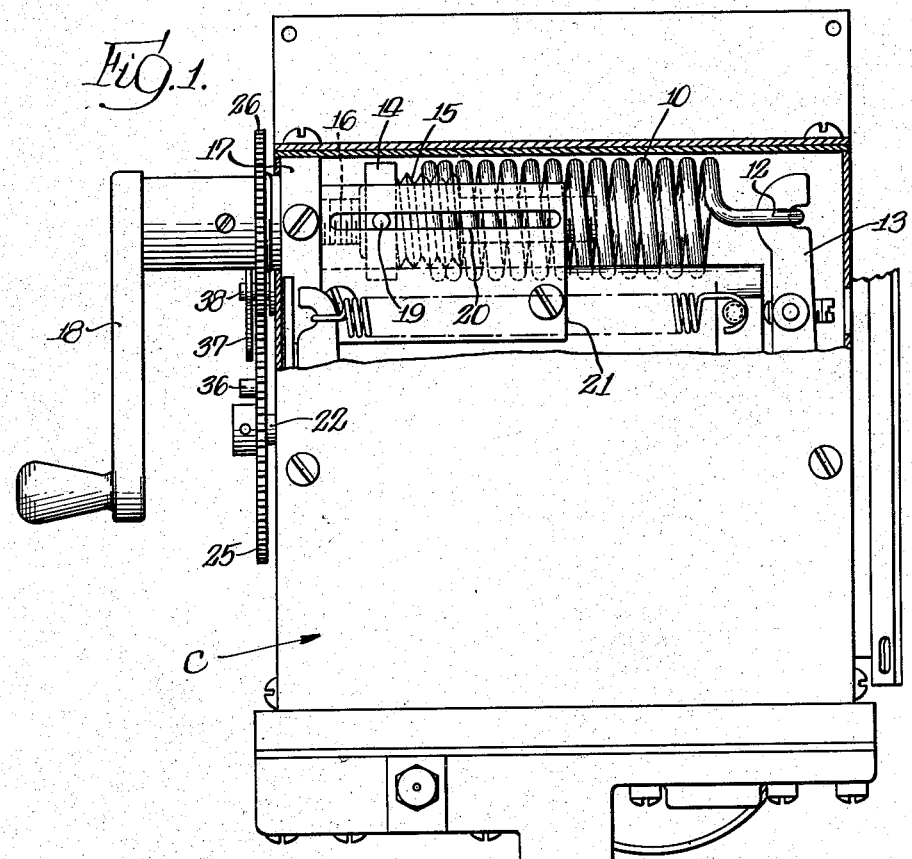
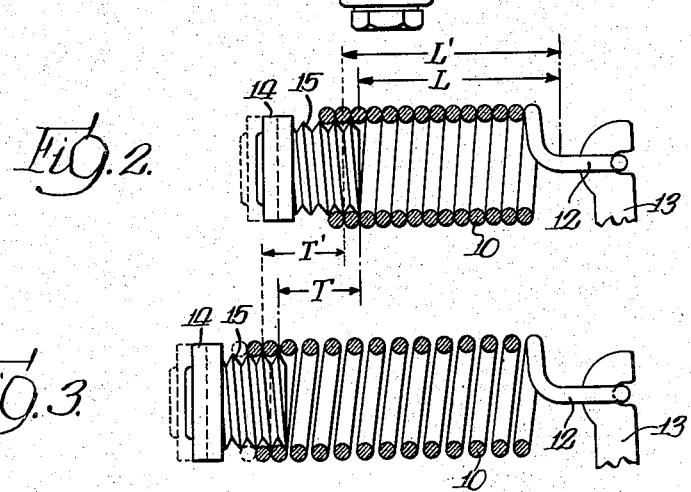
INVENTOR.
John J. Rothwell,
BY Bair & Freeman
Attys.

April 13, 1943.   J. J. ROTHWELL   2,316,626
CONTROL DEVICE
Filed Nov. 4, 1940   2 Sheets-Sheet 2
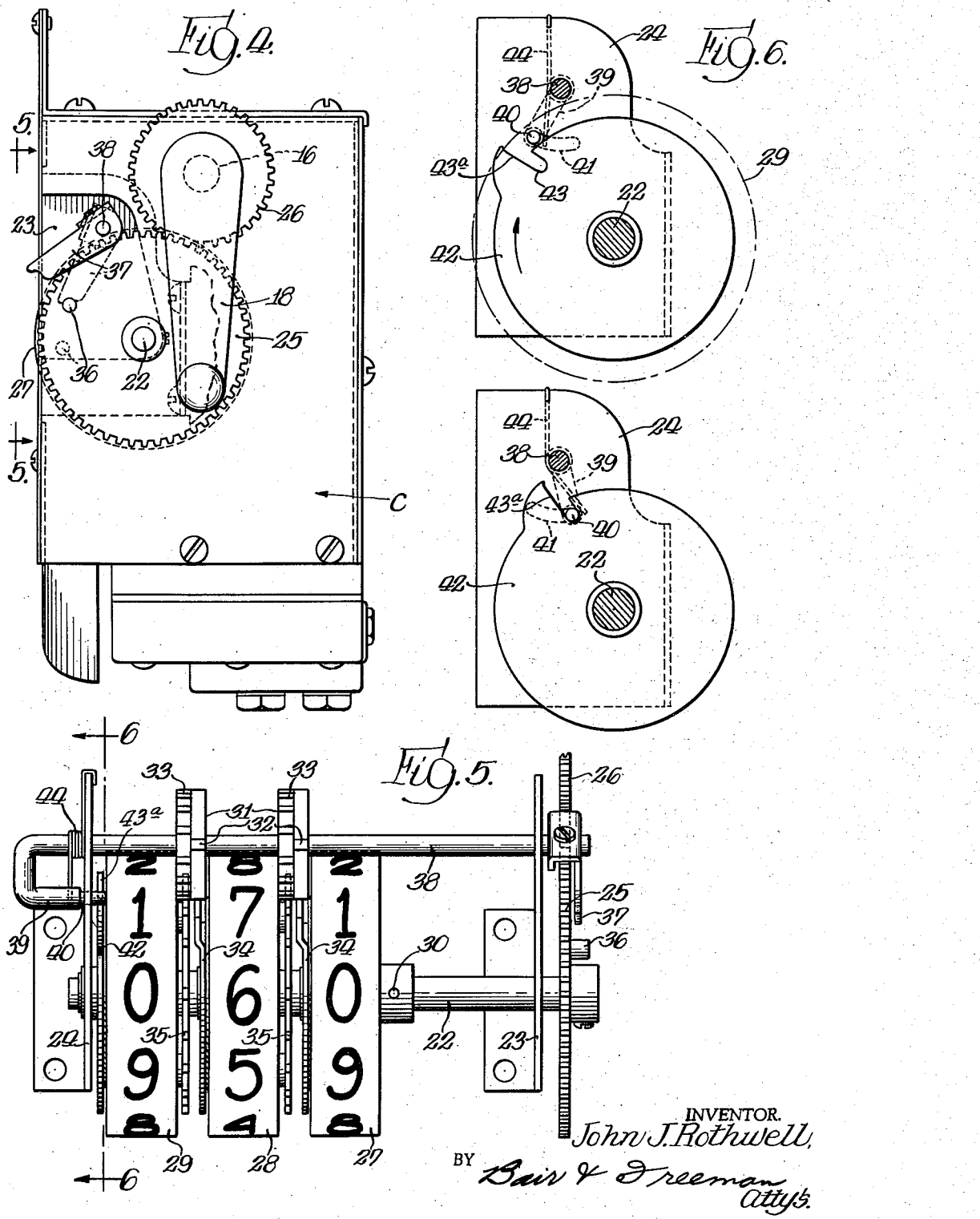
INVENTOR.
John J. Rothwell,
BY Bair & Freeman
attys.

Patented Apr. 13, 1943

2,316,626

UNITED STATES PATENT OFFICE 2,316,626

CONTROL DEVICE

John J. Rothwell, Elkhart, Ind., assignor to Penn Electric Switch Co., Goshen, Ind., a corporation of Iowa Application November 4, 1940, Serial No. 364,275

5 Claims. (Cl. 74—10)

My invention relates to a tire inflater or other control device having novel stop means for an adjusting device for the range spring and means to adjust the range spring for correcting its gradient.

One object of my invention is to provide stop means for a range spring adjusting means wherein the range spring adjusting means is adapted to rotate through a plurality of revolutions to cover the total range of adjustment of the range spring, with the stop means being operated from an indicating dial for the range spring adjusting means and effective to stop rotation of the range spring adjusting means during one of its revolutions.

A further object is to provide a rock shaft having a stop arm for the range spring adjusting means and geared down means, such as an indicating dial for the range spring adjusting means, effective to operate the rock shaft at the proper time to stop rotation of the range spring adjusting means in the desired position.

Still a further object is to provide a positive stop means which can be instantly recognized as such when a predetermined position, such as zero, is reached, and the stop means being operable to arrest all motion of the range spring adjusting means in a comparatively instantaneous manner.

Still a further object is to provide stop means which is so designed as to eliminate strain on the parts, with the impact of operation of the stop means being absorbed through a stop arm mounted on a rock shaft, the rock shaft being operable by a geared down element of a range spring adjusting crankshaft.

Still a further object is to provide a means to compensate for variation in gradient of the range spring so that an indicator can be set to accurately indicate the adjustment of the range spring even though the range springs used in manufacture may vary in different installations.

More particularly, it is my object to provide a connection for a range spring which consists of an element screw threaded into the spring and which may be screwed either further into the spring to increase its stiffness, or backed out to decrease the stiffness of the spring until it has been adjusted to register accurately at both the zero and any setting higher than zero to which the range spring adjusting means is adjusted.

With these and other objects in view, my invention consists in the construction, arrangement and combination of the various parts of my device whereby the objects contemplated are attained, as hereinafter more fully set forth, pointed out in my claims and illustrated in the accompanying drawings. Although the invention is susceptible of a variety of embodiments, it is unnecessary to fully describe and illustrate more than one in order to give a full understanding of the invention both from its structural and functional standpoints. Accordingly, I have illustrated a preferred and desirable embodiment of the invention in the accompanying drawings, in which:

Figure 1 is a rear elevation of a tire inflater embodying my invention showing a portion of the casing broken away to illustrate particularly the range spring of the tire inflater or control device;

Figure 2 is a diagrammatic view showing a range spring at zero pounds' pressure and illustrating by dotted lines an adjustment to compensate for gradient variation;

Figure 3 is a similar view showing the range spring stretched for operation at 60 pounds' pressure, for instance;

Figure 4 is an end elevation of the left hand end of Figure 1;

Figure 5 is a front elevation of a portion of the controller of Figure 4 as looking in the direction of the arrow 5—5;

Figure 6 is a sectional view on the line 6—6 of Figure 5, and

Figure 7 is a similar view showing the parts in a different position.

On the accompanying drawings I have used the reference character C to indicate generally a casing of a tire inflater or similar control device including a range spring 10. The range spring 10 has at one end a loop 12 operatively connected with a control arm 13. At the other end of the range spring a plug 14, having a screw threaded portion 15, is operatively connected with the spring 10 by being screwed into the coils thereof. The plug 14 is in the form of a nut threaded on a crankshaft 16, which crankshaft is rotatable in a bearing 17 and has an operating crank 18 mounted thereon. The plug or nut 14 is held against rotation by a pin 19 projecting therefrom and slidably mounted in a slot 20 of a bracket 21.

I have found in commercial practice that a tolerance in spring manufacture of plus or minus five per cent exists. Accordingly, if a range spring is to be loaded to sixty pounds, then errors of plus or minus three pounds would be encountered at the sixty-pound range, assuming that the instrument is accurate at the zero range. Therefore I have provided the spring 10 with an adjustable gradient accomplished by the screw threaded character of the portion 15 of the plug 14. By way of example, in Figure 2 the effective length of the spring is indicated at L. If the spring is too stiff, its stiffness may be relieved by increasing its effective length as L', for example, by screwing the plug 14 from its full line position to its dotted line position.

In the two instances illustrated, if the spring is now stretched a certain distance (T) to the position shown in Figure 3, a range from zero to sixty pounds (arbitrarily taken) would be the result. If some indicating means is connected with the plug 14 to indicate the change in setting of the range spring, it would register some higher figure as, for instance, sixty-one or sixty-two pounds, if the particular spring being used is too stiff. In that event, the plug 14 could be screwed outwardly as to the dotted position so that with the same distance of travel (indicated in this instance as T'), there would be less variation in range and the spring would then register from zero to sixty pounds in accordance with the indicating means which will hereinafter be described. It is obvious that by a simple screw threaded connection of the plug 14 relative to the coils of the spring 10, the effective length of the spring, or in other words its stiffness, can be varied to compensate for tolerances encountered in manufacture.

The indicating means which I show in connection with the range spring adjusting crank 18 consists of a countershaft 22 journaled as in brackets 23 and 24. A gear 25 meshes with a pinion 26, the gear being secured to the countershaft 22 and the pinion to the crankshaft 16. Indicating dials 27, 28 and 29 are provided, the dial 27 being secured as by a pin 30 to the countershaft 22 and carrying the lowest digit of the series of dials. The dial 29 carries the highest digit, while the dial 28 carries the intermediate digits.

In the usual manner of odometers and the like, a pair of special gears 31 are provided, each having a single tooth 32 on one half and a series of ten teeth 33 on the other half. The single teeth 32 mesh with single tooth gears 34 secured to the dials 27 and 28 and the ten teeth 33 of each gear 31 mesh with ten tooth gears 35 of the dials 28 and 29. Thus the dial 28 is rotated one digit each revolution of the dial 27, and the dial 29 is rotated one digit each ten revolutions of the dial 28.

A stop pin or abutment 36 is carried by the countershaft gear 25 and a stop arm 37 is provided therefor. The stop arm 37 is mounted on a rock shaft 38 journaled in the brackets 23 and 24 and having a crank pin 39 provided with a reduced portion 40 passing through an arcuate slot 41 of the bracket 24. The dial 29 has a cam 42 provided with a notch 43 adapted at times to receive the reduced end 40 of the crank pin 39. A spring 44 is associated with the rock shaft 38 and tends to rock it in a counterclockwise direction.

During the adjustment of the crank 18 at any point above zero, the rock shaft 38 will assume the position shown in Figure 4 with the stop arm 37 in its inoperative solid line position. The reduced end 40 of the crank pin 39, as shown in Figure 6, will during such adjustments assume a position at the left hand end of the slot 41 under the action of the spring 44, as shown in Figure 6. In Figure 6, the dial 29, for instance, is shown in its zero position. When the crank 18 is adjusted so that dials 28 and 27 also show zero, it is desirable that further movement of the crank in a zero direction effect operation of the stop arm 37. Accordingly, as the dials 29, 28 and 27 all tend to rotate backwards to 999 position, the cam 42 will move from the position of Figure 6 to the position of Figure 7, so that a side 43a of the slot 43 will engage the reduced end 40 of the crank pin 39 and swing it against the action of the spring 44 to the position of Figure 7. This will effect movement of the arm 37 from its solid position to its dotted position of Figure 4, so that it is directly in the path of the movement of the stop pin 36. Accordingly, when the stop pin 36 reaches the arm, the arm will take the impact of stopping by a thrust through the arm directly to the rock shaft 38 and provide a positive stop against the crank 18 being rotated any further in a receding direction. Thus I provide stop means for a range spring adjusting element, which element rotates through a plurality of revolutions through the range of adjustment of the spring with assurance of stopping at a predetermined position during one of such revolutions.

Although I have shown my range spring compensating means and stop means for the adjusting mechanism of the range spring in connection with a tire inflater, it is obvious that these novel features can be used in connection with any control device having a range spring or the like where it is desirable to compensate for variations in gradient and effect a stop of the adjusting means, when such adjusting means is of the type that is rotated through greater than one revolution. Also, the cam 42 is conveniently operated by the indicating dial 29 but could be merely a cam geared down relative to the adjusting shaft 16.

Changes of the character just suggested, and others as well, may be made without departing from the rear spirit and purpose of my invention, and it is my intention to cover by my claims any modified forms of structure or use of mechanical equivalents which may be reasonably included within their scope wtihout sacrificing any of the advantages thereof.

I claim as my invention:

1. In a device of the class described, a crankshaft rotatable through a plurality of revolutions, a series of indicating dials operatively connected with said crankshaft, and stop means for said crankshaft controlled by that one of said indicating dials indicating the highest digit, said stop means comprising an abutment operatively connected with said crankshaft, a stop arm for said abutment, a rock shaft having said stop arm mounted thereon, and means for swinging said rock shaft to stop position of said stop arm relative to said abutment adjacent the zero position of said one of said indicating dials, said one of said indicating dials having a cam notch to receive said rock shaft to effect such movement of said rock shaft and thereby to move said stop arm to stop position relative to said abutment.

2. In a device of the class described, a shaft rotatable through a plurality of revolutions, a series of indicating dials operatively connected with said shaft, and stop means for said shaft controlled by one of said indicating dials, said stop means comprising an abutment operatively connected with said shaft, a stop element for said abutment, and means for moving said stop element relative to said abutment, said one of said indicating dials having a cam notch to effect such movement of said stop element to stop position.

3. In a device of the class described, a shaft rotatable through a plurality of revolutions, a countershaft geared to said first shaft and having an abutment, a series of indicating dials, said countershaft driving the dial having the lowest digit, the dial having the highest digit being driven at less speed than said first mentioned dial from said countershaft, and stop means for said countershaft controlled by said last mentioned dial.

4. In a device of the class described, a crankshaft rotatabe through a plurality of revolutions, a countershaft geared to said crankshaft and having an abutment, a series of indicating dials, said countershaft driving the dial having the lowest digit, the dial having the highest digit being driven at less speed than said first mentioned dial from said countershaft, stop means for said countershaft controlled by said last mentioned dial, said stop means comprising an abutment carried by said countershaft, a stop arm for said abutment, a rock shaft having said stop arm mounted thereon, and means for swinging said rock shaft to stop position of said arm relative to said abutment, said last indicating dial having a cam notch to receive said rock shaft to effect such movement of said rock shaft and thereby of said rock arm to stop position relative to said abutment.

5. In a device of the class described, adjusting means adapted to revolve through a plurality of revolutions, stop means to stop the rotation of said adjusting means during one such revolution, said stop means including a rock shaft carrying a pair of arms, one of said arms being movable to stop position, indicating means for indicating the position of adjustment of the adjusting means, said indicating means having an indicating element geared down relative to said adjusting means and said indicating means having a cam coacting with the other of said arms to rock said rock shaft and thereby move said first arm to effective stop position in one position of said geared down indicating element.

JOHN J. ROTHWELL.